(12) United States Patent
Hong et al.

(10) Patent No.: US 9,136,511 B2
(45) Date of Patent: Sep. 15, 2015

(54) BATTERY PACK

(75) Inventors: Ki-Sung Hong, Yongin-si (KR); Seung-Il Kim, Yongin-si (KR)

(73) Assignee: SAMSUNG SDI CO., LTD., Yongin-si, Gyeonggi-do (KR)

( * ) Notice: Subject to any disclaimer, the term of this patent is extended or adjusted under 35 U.S.C. 154(b) by 343 days.

(21) Appl. No.: 13/539,138

(22) Filed: Jun. 29, 2012

(65) Prior Publication Data

US 2013/0149561 A1 Jun. 13, 2013

(30) Foreign Application Priority Data

Dec. 9, 2011 (KR) .................... 10-2011-0132081

(51) Int. Cl.
| | |
|---|---|
| H01M 2/02 | (2006.01) |
| H01M 2/04 | (2006.01) |
| H01M 2/06 | (2006.01) |
| H01M 2/08 | (2006.01) |
| H01M 10/42 | (2006.01) |
| H01M 10/04 | (2006.01) |

(52) U.S. Cl.
CPC .............. *H01M 2/06* (2013.01); *H01M 2/0469* (2013.01); *H01M 10/425* (2013.01); *H01M 2/0207* (2013.01); *H01M 2/08* (2013.01); *H01M 10/0436* (2013.01); *H01M 2200/106* (2013.01)

(58) Field of Classification Search
USPC ............................................. 429/7, 163–187
See application file for complete search history.

(56) References Cited

U.S. PATENT DOCUMENTS

| | | | |
|---|---|---|---|
| 2004/0251872 A1 | 12/2004 | Wang et al. | |
| 2005/0175889 A1 | 8/2005 | Han | |
| 2006/0035141 A1* | 2/2006 | Lee | 429/176 |
| 2006/0068275 A1* | 3/2006 | Chung et al. | 429/121 |
| 2006/0266542 A1* | 11/2006 | Yoon | 174/112 |
| 2008/0176131 A1* | 7/2008 | Byun et al. | 429/122 |
| 2010/0086845 A1 | 4/2010 | Jung et al. | |
| 2011/0171498 A1* | 7/2011 | Baek | 429/7 |
| 2012/0208047 A1* | 8/2012 | Park et al. | 429/7 |

FOREIGN PATENT DOCUMENTS

| | | |
|---|---|---|
| KR | 2005-0074197 A | 7/2005 |
| KR | 2006-0032591 A | 4/2006 |
| KR | 0821857 B1 | 4/2008 |

* cited by examiner

*Primary Examiner* — Basia Ridley
*Assistant Examiner* — Caitlin Wilmot
(74) *Attorney, Agent, or Firm* — Knobbe, Martens, Olson & Bear LLP

(57) ABSTRACT

A battery pack includes a pouch-type bare cell having a sealing region positioned in an extraction direction of an electrode lead; a protecting circuit module positioned in the sealing region of the bare cell and connected to the electrode lead; and a top case implemented in a shape in which only a surface facing the sealing region is opened and the other surfaces are integrally formed to cover the protecting circuit module. In the battery pack, a bottom surface of the top case comes in surface contact with a top surface of the bare cell, and the shape of the bottom surface of the top case is implemented in a bent shape so as to correspond to the shape of the top surface of the bare cell.

15 Claims, 3 Drawing Sheets

BATTERY PACK

RELATED APPLICATIONS

This application claims priority to and the benefit of Korean Patent Application No. 10-2011-0132081, filed on Dec. 9, 2011, in the Korean Intellectual Property Office, the entire content of which is incorporated herein by reference.

BACKGROUND

1. Field

An aspect of the present invention relates to a battery pack, and more particularly, to a battery pack capable of preventing damage of a component mounted on a protection circuit module from an external impact.

2. Description of the Related Art

In general, secondary batteries refer to rechargeable batteries, unlike primary batteries that cannot be recharged. The secondary batteries are widely used in the field of electronic devices such as a cellular phone, a notebook computer and a camcorder.

Among various kinds of secondary batteries, a lithium secondary battery is widely used because of its high operating voltage and high energy density per unit weight. The lithium secondary battery is manufactured in several shapes, and cylinder-type, can-type and pouch-type secondary batteries are used as representative shapes of the lithium secondary batteries.

The pouch-type secondary battery is formed by inserting an electrode assembly into a pouch and sealing the pouch, and an electrode lead connected to an electrode tab of the electrode assembly is connected to a component such as a protecting circuit module (PCM) or positive temperature coefficient (PTC), thereby forming a core pack. In this case, the configuration including the electrode sealed by the pouch and the electrode tab is referred to as a bare cell.

A top case for surrounding the PCM is formed at an upper part of the core pack, and the core pack is built in a hard case or surrounded by a label for packing, thereby forming a battery pack.

In this case, the top case is attached to a top surface of the bare cell using an adhesive or the like. When the top surface of the bare cell is implemented in a bent shape by the shape of the electrode assembly provided to the inside of the bare cell, the adhesion between the top surface of the bare cell and the top case is inferior, and therefore, the assembling quality of the battery pack may be reduced.

SUMMARY

Embodiments provide a battery pack in which the shape of a top case coming in surface contact with a top surface of a bare cell is implemented to correspond to that of the top surface of the bare cell, so that it is possible to prevent or inhibit a failure of adhesion between the top surface of the bare cell and the top case and accordingly improve the assembling quality of the battery pack.

According to an aspect of the present invention, there is provided a battery pack including: a pouch-type bare cell having a top surface that is bent and a sealing region positioned in an extraction direction of an electrode lead; a protecting circuit module positioned adjacent the sealing region of the bare cell and connected to the electrode lead; and a top case having a shape that defines an opening that faces the sealing region wherein the other surfaces of the case, including a bottom surface, are integrally formed to cover the protecting circuit module, wherein the bottom surface of the top case comes in surface contact with the top surface of the bare cell, and the shape of the bottom surface of the top case is implemented in a bent shape so as to correspond to the shape of the top surface of the bare cell.

The section of the top case may be formed in a '⊏' shape. The top case may be implemented in a shape surrounding a mounting surface of a component of the protecting circuit module, a connection surface between the protecting circuit module and the electrode lead and the other surface that is a surface opposite to one surface of the protecting circuit module, facing the terrace part.

The top surface of the bare cell may be implemented in a bent shape. The shape of the bottom surface of the top case may be implemented identical to that of the top surface of the bare cell.

An adhesive member with elasticity may be further formed between the top surface of the bare cell and the bottom surface of the top case.

The top case may have a groove formed in a region corresponding to the electrode lead.

The battery pack may further include an outer tape for covering the top case and an upper part of the bare cell.

An extending support part protruded in a direction of the top surface of the bare cell may be further formed at one end of the bottom surface of the top case.

The extending support part may be adhered closely to a rounded top surface of the bare cell. A surface of the extending support part, coming in surface contact with the rounded top surface of the bare cell, may be implemented in a rounded shape identical to that of the rounded top surface of the bare cell.

As described above, according to the present invention, a top case is provided to protect components of a protecting circuit module, so that it is possible to protect the components from an external impact and to prevent foreign matters from being inserted into the battery pack, thereby ensuring the reliability and stability of the battery pack.

Further, the shape of a bottom surface of the top case, coming in surface contact with a top surface of a bare cell, is implemented to correspond to that of the top surface of the bare cell, so that it is possible to prevent a failure of adhesion between the top surface of the bare cell and the bottom surface of the top case, thereby ensuring the assembling quality of the battery pack.

In another embodiment, the aforementioned needs are satisfied by a battery pack which comprises a pouch-type bare cell having a top surface that defines a concave exterior and a sealing region positioned in an extraction direction of an electrode lead and a protecting circuit module positioned adjacent the sealing region of the bare cell and connected to the electrode lead. In this embodiment, the battery pack also includes a top case having a first side and an opposed second side and third side that interconnects the first and second sides wherein an opening is formed opposite the third side wherein the protecting circuit module is positioned within a space defined by the first, second and third sides and wherein the first side of the top case is positioned on the top surface of the pouch-type bare cell and wherein the first side has a convex shape that matches the concave exterior of the top surface of the pouch-type bare cell.

BRIEF DESCRIPTION OF THE DRAWINGS

The accompanying drawings, together with the specification, illustrate exemplary embodiments of the present inven

DETAILED DESCRIPTION

Figure 1:
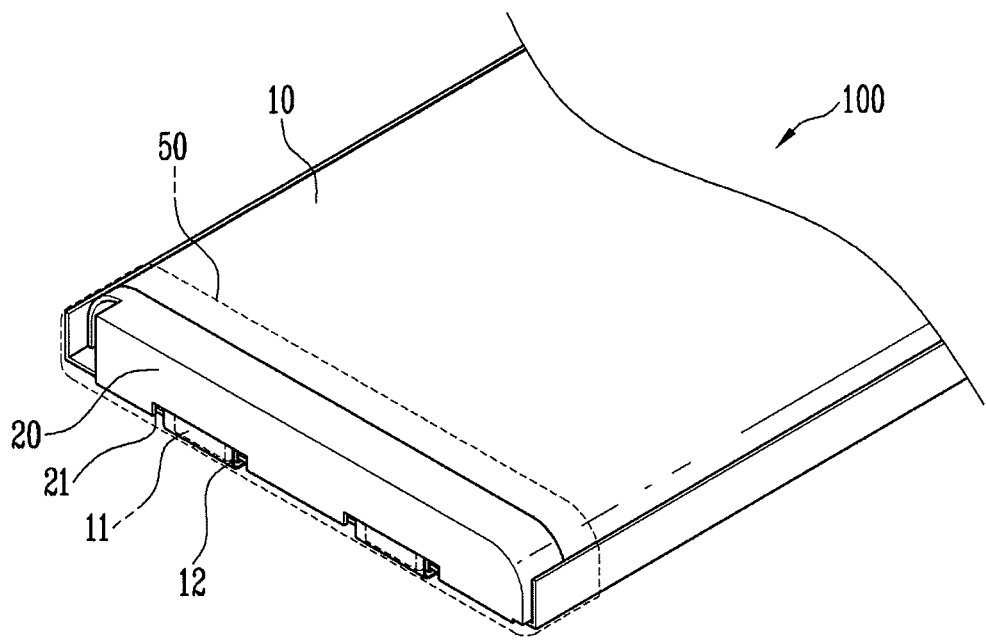
- FIG. 1 is a perspective view of a battery pack according to an embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. In addition, when an element is referred to as being "on" another element, it can be directly on the another element or be indirectly on the another element with one or more intervening elements interposed therebetween. Also, when an element is referred to as being "connected to" another element, it can be directly connected to the another element or be indirectly connected to the another element with one or more intervening elements interposed therebetween. Hereinafter, like reference numerals refer to like elements.

Hereinafter, exemplary embodiments of the present invention will be in detail with reference to the accompanying drawings.

Figure 2:
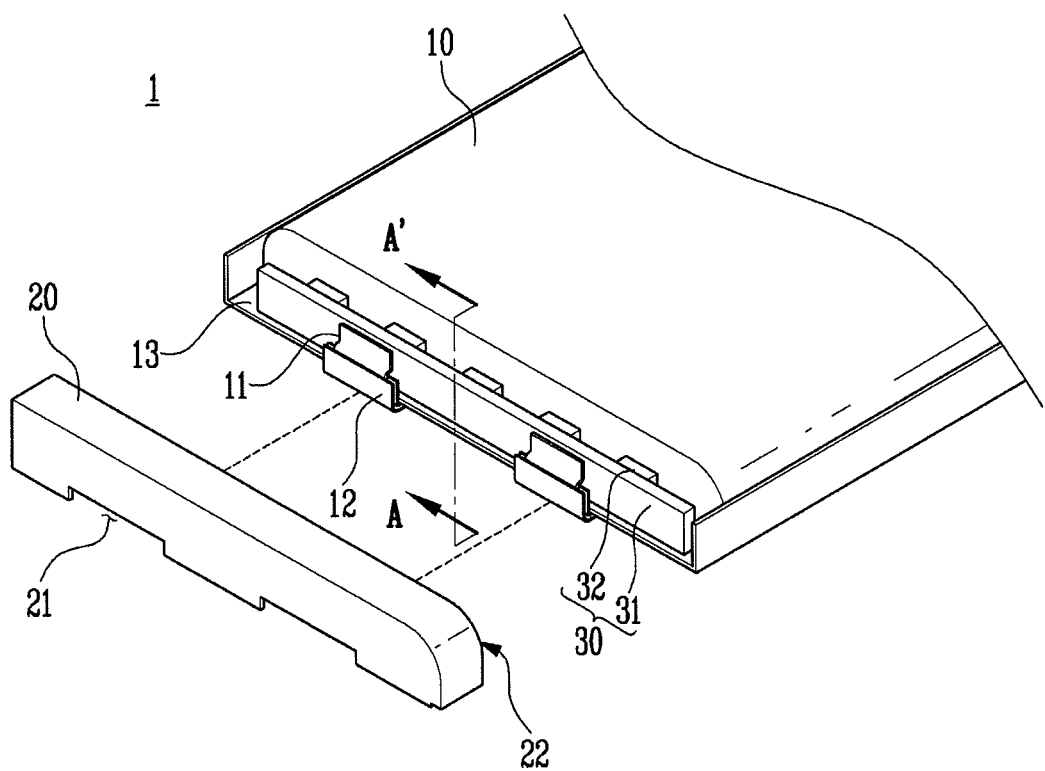
FIG. 2 is an exploded perspective view showing a state in which a top case is separated from the battery pack according to the embodiment of the present invention.

FIG. 1 is a perspective view of a battery pack according to an embodiment of the present invention. FIG. 2 is an exploded perspective view showing a state in which a top case is separated from the battery pack according to the embodiment of the present invention.

Referring to FIGS. 1 and 2, the battery pack 100 according to this embodiment includes a pouch-type bare cell 10, a protecting circuit module 30 and a top case 20 for surrounding the protecting circuit module 30.

The pouch-type bare cell 10 accommodates an electrode assembly (not shown) in the inside thereof, and has a terrace part 13 or protruding member that is a sealing region positioned in the extraction direction of an electrode lead 11 connected to an electrode tab of the electrode assembly. The protecting circuit module 30 connected to the electrode lead 11 is positioned at or adjacent the terrace part 13. In this case, the top case 20 may be formed in a '⊏' shape so as to surround the protecting circuit module 30.

That is, the top case 20 may surround a mounting surface of a component 32 of the protecting circuit module 30, a connection surface between a protecting circuit board 31 and the electrode lead 11 and the other surface of the protecting circuit module 30, which is a surface opposite to one surface of the protecting circuit module 30 facing the terrace part 13. Through the structure of the top case 20, it is possible to prevent or inhibit damage of the component 32 when an impact between the component 32 and the top case 20 occurs due to an external impact.

As described above, the top case 20 is formed in a shape in which only a surface facing the terrace part 13 is opened and the other surfaces are integrally formed to cover the protecting circuit module 31, i.e., in a shape of which section has a '⊏' shape. In this case, a bottom surface 22 of the top case 20 comes in surface contact with the top surface of the bare cell 10.

The electrode assembly is accommodated in the inside of a pouch of the pouch-type bare cell 10, and the pouch-type bare cell 10 has the terrace part 13 that is the sealing region positioned in the extraction direction of the electrode lead 11 connected to the electrode tab of the electrode assembly. Parts of the sealing region respectively positioned at both sides of the terrace part in the extraction direction of the electrode lead 11 are adhered closely to the pouch while being bent to sides of the pouch.

A metal thin plate such as an aluminum thin plate formed by performing an insulation process on the surface thereof is frequently used as the pouch. For example, in the pouch, casted polypropylene (CPP) that is polymer resin is coated as a thermal adhesive layer on an aluminum thin plate, and a resin material such as nylon or polyethylene terephthalate (PET) is formed on the outer surface of the thermal adhesive layer.

The electrode assembly accommodated in the inside of the pouch has a structure in which a positive electrode plate, a negative electrode plate and a separator interposed therebetween are sequentially stacked or wound. That is, the electrode assembly is divided into a winding-type electrode assembly and a stacking-type electrode assembly. Here, the winding-type electrode assembly is formed by interposing a separator between positive and negative electrode plates and winding them in a jelly-roll shape, and the stacking-type electrode assembly is formed by stacking a plurality of positive electrode plates, a plurality of negative electrode plates and a plurality of separators.

However, since the electrode assembly is not adhered closely to an inner surface of the pouch, the electrode assembly may be moved in a top/bottom direction or in a front/rear direction. Further, since the strength of the pouch is weak, the top surface of the bare cell 10 may be implemented in a bent shape by the shape of the electrode assembly in the inside of the pouch. In one implementation, the top surface is concave.

When the top surface of the bare cell 10 is implemented in a bent shape, the adhesion between the top surface of the bare cell 10 and the bottom surface 22 of the top case 20 is reduced, and therefore, the assembling quality of the battery pack may be deteriorated. In order to address such a problem, in this embodiment, the shape of the bottom surface 22 of the top case 20 is implemented to correspond to that of the top surface of the bare cell 10. In one implementation, it may be convex to match the concave top surface of the bare cell.

Figure 3:
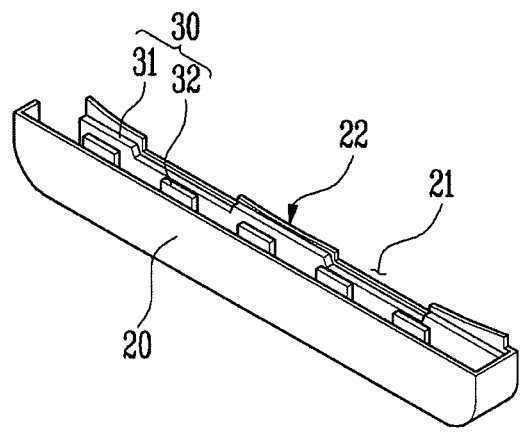
FIG. 3 is a perspective view showing a state in which a protecting circuit module is inserted into the inside of the top case according to the embodiment of the present invention.
Figure 4:
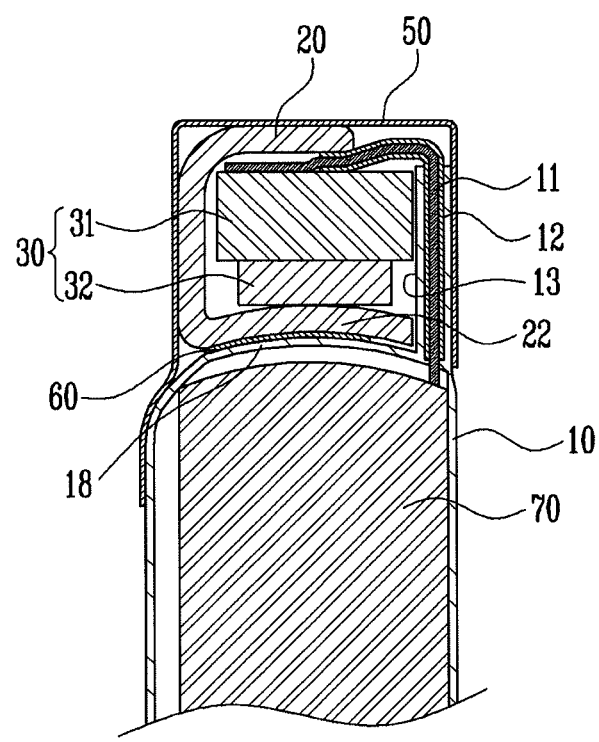
FIG. 4 is a sectional view of the battery pack according to the embodiment of the present invention.

The shape of the top surface of the bare cell 10 and the shape of the bottom surface of the top case 20 are shown in FIGS. 3 and 4, and will be described in detail below.

Electrode tabs attached to the positive and negative electrode plates of the electrode assembly are electrically connected to electrode leads 11 having different polarities, respectively. Parts of the electrode leads 11 are exposed to the terrace part 13 of the pouch so as to be electrically connected to the protecting circuit module 30 in a subsequent process.

An insulating tape 12 is further formed on an outer surface of each of the electrode leads 11 positioned at the terrace part 13. The insulating tape 12 may be formed so as to improve the sealing force between the electrode lead 11 and the pouch and to ensure an electrical insulation state.

The protecting circuit module 30 is positioned at the terrace part 13 of the bare cell 10, and has positive and negative electrode terminals electrically connected to the respective electrode leads on one surface thereof. The other surface of the protecting circuit module 30 has a form in which various types of electronic components 32 are mounted on the protecting circuit board 31 having a protecting circuit part printed therein.

The top case 20 surrounds the protecting circuit module 30 so as to protect the protecting circuit module 30, and is mounted on the top surface of the bare cell 10. In the top case 20, a groove 21 is formed in a region corresponding to each of the electrode leads 11 so as to avoid interference between the top case 20 and the electrode leads 11. In this case, the insulating tape 21 is formed to extend up to an outer surface of the electrode lead 11 exposed through the groove 21 of the top case 20, so that it is possible to prevent or inhibit short circuits between the top case 20 and the electrode lead 11.

An outer tape 50 is formed to cover the top case 20 and an upper part of the bare cell 10 when the bare cell 10 and the protecting circuit module 30 are connected to each other and the top case 20 surrounds the protecting circuit module 30. That is, the outer tape 50 covers the upper part of the bare cell 10, so that the top case 20 can be easily fixed to the top surface of the bare cell 10.

FIG. 3 is a perspective view showing a state in which a protecting circuit module is inserted into the inside of the top case according to the embodiment of the present invention.

Referring to FIG. 3, it can be seen that the protecting circuit module 30 is inserted into the inside of the top case 20. The top case 20 is formed in a shape in which only the surface facing the terrace part 13 (See FIG. 2) is opened and the other surfaces are all covered in a single body, i.e., in a shape of which section has a '⊏' shape so as to surround the protecting circuit module 30. In this case, the bottom surface 22 of the top case 20 comes in surface contact with the top surface of the bare cell 10 (See FIG. 2).

That is, the top case 20 may surround the mounting surface of the components 32 of the protecting circuit module 30, the connection surface between the protecting circuit module 30 and the electrode lead 11 (See FIG. 2) and the other surface that is the opposite surface to the one surface of the protecting circuit module 30, facing the terrace part 13 (See FIG. 2).

However, as described above, the top surface of the bare cell may be implemented in a bent shape. Accordingly, in this embodiment, as shown in FIG. 3, the shape of the bottom surface 22 of the top case 20, coming in surface contact with the top surface of the bare cell 10 is implemented in a bent shape so as to correspond to the shape of the top surface of the bare cell 10.

The top case 20 having the shape described above may be manufactured in various manners. For example, when the top case 20 is molding-treated by an injection molding method using resin for hot melting, the top case 20 can be implemented in a shape corresponding to the top surface of the bare cell 10.

FIG. 4 is a sectional view of the battery pack according to the embodiment of the present invention.

Referring to FIG. 4, the pouch-type bare cell 10 has the terrace part 13 that is a sealing region positioned in the extraction direction of the electrode lead 11. The electrode lead 11 is extracted through the terrace part 13 of the pouch-type bare cell 10, and the insulating tape 12 is formed on the outer surface of the electrode lead 11 coming in contact with the terrace part 13. The electrode lead 11 is electrically connected to one surface of the protecting circuit board 31, and the components 32 are mounted on the other surface of the protecting circuit board 31, to which the electrode lead 11 is not connected.

The protecting circuit module 30, which is electrically connected to the bare cell 10 and mounted on the terrace part 13 of the bare cell 10, is surrounded and protected by the top case 20. That is, the top case 20 is formed in the '⊏' shape so as to surround three surfaces of the protecting circuit module 30 except the side of the protecting circuit module 30, facing the terrace part 13 of the bare cell 10.

The '⊏'-shaped top case 20 is formed to surround the mounting surface of the components 32 of the protecting circuit module 30, the connection surface between the protecting circuit module 30 and the electrode lead 11 and the other surface that is the opposite surface to the one surface of the protecting circuit module 30, facing the terrace part 13.

In this case, the top surface 18 of the bare cell 10 may be implemented in a bent shape. Accordingly, in this embodiment, as shown in FIG. 4, the shape of the bottom surface 22 of the top case 20, coming in surface contact with the top surface of the bare cell 10, is implemented in the bent shape so as to correspond to the shape of the top surface 18 of the bare cell 10.

Here, the top surface 18 of the bare cell 10 is formed in the bent shape by the shape of the electrode assembly 70 provided to the inside of the bare cell 10. This is because the material of the outer surface of the bare cell 10 including the top surface 18 is weak.

An adhesive member 60 may be further formed between the top surface 18 of the bare cell 10 and the bottom surface 22 of the top case 20. The adhesive member 60 is implemented using a material with elasticity, so that it is possible to more improve an adhesive property between the top surface 18 of the bare cell 10 and the bottom surface 22 of the top case 20.

The outer tape 50 is further formed to cover the top case 20 and the upper part of the bare cell 10, so that the top case 20 can be more firmly fixed to the top of the bare cell 10.

Figure 5:
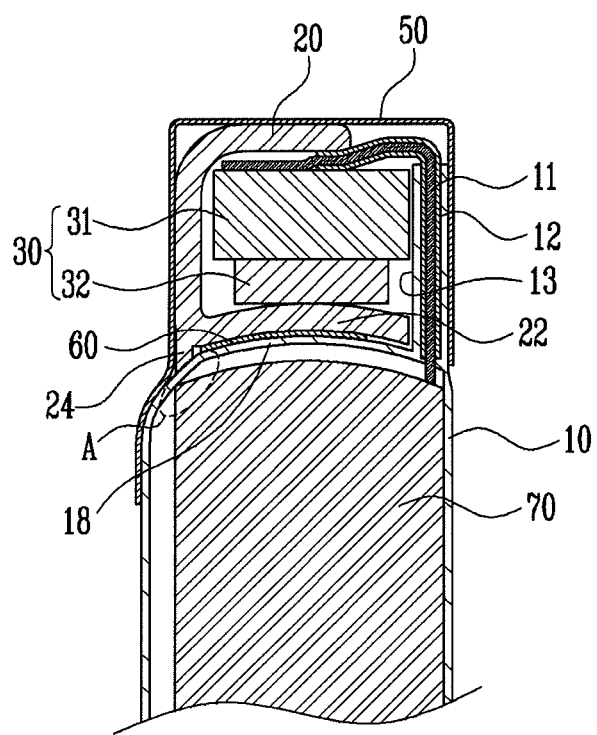
FIG. 5 is a sectional view of a battery pack according to another embodiment of the present invention.

FIG. 5 is a sectional view of a battery pack according to another embodiment of the present invention.

The embodiment shown in FIG. 5 is different from the embodiment shown in FIG. 4 in that an extending support part 24 is further formed at one end of the bottom surface 22 of the top case 20. Therefore, components identical to those of FIG. 4 are designated by like reference numerals, and their detailed descriptions will be omitted.

In the embodiment shown in FIG. 5, the extending support part 24 protruded in a vertical direction is further provided at the one end of the bottom surface 22 of the top case 20, i.e., at the end of the bottom surface 22 of the top case 20, adjacent to the outer tape 50.

In this case, the extending support part 24 may be integrally formed with the top case 20. The extending support part 24 is implemented to be adhered closely to the rounded (A) top surface 18 of the bare cell 10.

That is, the surface of the extending support part 24, coming in surface contact with the rounded (A) top surface 18 of the bare cell 10, is implemented in a rounded shape identical to that of the rounded (A) top surface 18 of the bare cell 10. Accordingly, the top case 20 can be more firmly fixed to the top of the bare cell 10.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A battery pack comprising:
a pouch-type bare cell having a top surface that is bent and a sealing region positioned in an extraction direction of an electrode lead, wherein the top surface of the pouch-type bare cell is perpendicular to the extraction direction of the electrode lead;
a protecting circuit module having a thickness that is positioned adjacent the sealing region of the bare cell and connected to the electrode lead; and
a top case having a C-shape that defines an opening that faces the sealing region wherein the other surfaces of the top case, including a bottom surface, are integrally formed to cover the protecting circuit module wherein the opening of the top case has a width that is wider than the thickness of the protecting circuit module and wherein the top case is mounted on the to surface of the pouch-type bare cell so that the opening extends in a direction that is perpendicular to the top surface of the pouch-type bare cell and wherein the electrode lead extends into the top case and is connected to the protecting circuit module inside the top case via the opening in the top case,
wherein the bottom surface of the top case comes in surface contact with the top surface of the bare cell, and the shape of the bottom surface of the top case is implemented in a bent shape so as to correspond to the shape of the top surface of the bare cell.

2. The battery pack according to claim 1, wherein the top surface of the bare cell is implemented in a bent shape.

3. The battery pack according to claim 2, wherein the shape of the bottom surface of the top case is implemented identical to that of the top surface of the bare cell.

4. The battery pack according to claim 1, wherein an adhesive member with elasticity is further formed between the top surface of the bare cell and the bottom surface of the top case.

5. The battery pack according to claim 1, wherein the top case defines a terrace part and is implemented in a shape surrounding a mounting surface of a component of the protecting circuit module, a connection surface between the protecting circuit module and the electrode lead and the other surface that is a surface opposite to one surface of the protecting circuit module, facing the terrace part.

6. The battery pack according to claim 1, wherein the top case has a groove formed in a region corresponding to the electrode lead.

7. The battery pack according to claim 1, further comprising an outer tape for covering the top case and an upper part of the bare cell.

8. The battery pack according to claim 1, wherein an extending support part protruded in a direction of the top surface of the bare cell is further formed at one end of the bottom surface of the top case.

9. The battery pack according to claim 8, wherein the extending support part is adhered closely to a rounded top surface of the bare cell.

10. The battery pack according to claim 9, wherein a surface of the extending support part, coming in surface contact with the rounded top surface of the bare cell, is implemented in a rounded shape identical to that of the rounded top surface of the bare cell.

11. A battery pack comprising:
a pouch-type bare cell having a top surface that defines a concave exterior and a sealing region positioned in an extraction direction of an electrode lead wherein the top surface of the pouch-type bare cell is perpendicular to the extraction direction of the electrode lead;
a protecting circuit module having a thickness that is positioned adjacent the sealing region of the bare cell and connected to the electrode lead;
a top case having a first side and an opposed second side and third side that interconnects the first and second sides wherein an opening is formed opposite the third side wherein the protecting circuit module is positioned within a space defined by the first, second and third sides and wherein the first side of the top case is positioned on the top surface of the pouch-type bare cell and wherein the first side has a convex shape that matches the concave exterior of the top surface of the pouch-type bare cell and wherein the opening is larger than the protecting circuit module and wherein the top case is mounted on the top surface of the pouch-type bare cell so that the opening extends in a direction that is perpendicular to the top surface of the pouch-type bare cell and wherein the electrode lead extends into the top case and is connected to the protecting circuit module inside the top case via the opening in the top case.

12. The battery pack of claim 11, wherein the interior contour of the convex shape of the first side of the top case is identical to the exterior contour of the concave shape of the top surface of the pouch-type bare cell.

13. The battery pack of claim 11, further comprising an adhesive member with elasticity that is positioned between the first side of the top case and the top surface of the bare cell.

14. The battery pack of claim 11, wherein the top case has a groove formed therein so as to permit the electrode lead to extend therethrough and contact the protecting circuit module.

15. The battery pack of claim 11, wherein the pouch-type bare cell includes an extending part that extends outward of the bare cell so as to be positioned proximate the opening of the top case when the top case is positioned adjacent the sealing region of the bare cell.

* * * * *